United States Patent
Takeuchi

(10) Patent No.: US 9,615,017 B2
(45) Date of Patent: Apr. 4, 2017

(54) FOCUS DETECTION APPARATUS AND METHOD, METHOD OF CONTROLLING FOCUS DETECTION APPARATUS, AND IMAGE CAPTURING APPARATUS

(71) Applicant: CANON KABUSHIKI KAISHA, Tokyo (JP)

(72) Inventor: Kengo Takeuchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/295,651

(22) Filed: Jun. 4, 2014

(65) Prior Publication Data

US 2014/0362279 A1  Dec. 11, 2014

(30) Foreign Application Priority Data

Jun. 11, 2013 (JP) .................................. 2013-123176
Nov. 1, 2013 (JP) .................................. 2013-228755

(51) Int. Cl.
*H04N 5/232* (2006.01)
*H04N 5/369* (2011.01)

(52) U.S. Cl.
CPC ....... *H04N 5/23212* (2013.01); *H04N 5/3696* (2013.01)

(58) Field of Classification Search
CPC .......................... H04N 5/23212; H04N 5/3696
See application file for complete search history.

(56) References Cited

U.S. PATENT DOCUMENTS

| | | | |
|---|---|---|---|
| 6,781,632 B1 * | 8/2004 | Ide ......................... | G03B 13/00 250/201.2 |
| 8,098,321 B2 * | 1/2012 | Shimoda ........... | H01L 27/14623 348/340 |
| 8,754,976 B2 * | 6/2014 | Oikawa .................. | G03B 13/36 348/273 |
| 2007/0206940 A1 * | 9/2007 | Kusaka .................. | G03B 13/28 396/128 |
| 2007/0237511 A1 | 10/2007 | Kusaka | |

(Continued)

FOREIGN PATENT DOCUMENTS

| | | |
|---|---|---|
| JP | 58-024105 A | 2/1983 |
| JP | 2005-106994 A | 4/2005 |

*Primary Examiner* — Timothy J Henn
(74) *Attorney, Agent, or Firm* — Cowan, Liebowitz & Latman, P.C.

(57) ABSTRACT

A focus detection apparatus comprises: an image sensing unit including photoelectric conversion elements for each microlens, with the microlenses being two-dimensionally arranged; a generation unit configured to generate a first signal pair having a first resolution from signals of a first area of the image sensing unit which corresponds to a predetermined focus detection area and generate a second signal pair having a second resolution lower than the first resolution from signals of a second area which corresponds to the predetermined focus detection area and is wider than the first area; a focus detection unit configured to perform phase difference focus detection processing based on at least one of the first and second signal pairs; and a recording image generation unit configured to generate a recording image from a signal output from the image sensing unit.

21 Claims, 13 Drawing Sheets

(56) References Cited

U.S. PATENT DOCUMENTS

| | | | | |
|---|---|---|---|---|
| 2010/0321515 A1* | 12/2010 | Imamura | ............ | H04N 5/23212 |
| | | | | 348/222.1 |
| 2011/0298963 A1 | 12/2011 | Kato et al. | | |
| 2014/0016021 A1* | 1/2014 | Uchida | .................. | G03B 13/36 |
| | | | | 348/353 |
| 2014/0211075 A1* | 7/2014 | Inoue | ....................... | G02B 7/28 |
| | | | | 348/349 |
| 2014/0293118 A1* | 10/2014 | Yanada | ................ | H04N 5/3696 |
| | | | | 348/350 |
| 2015/0319420 A1* | 11/2015 | Fettig | ................ | H04N 13/0228 |
| | | | | 348/49 |

* cited by examiner

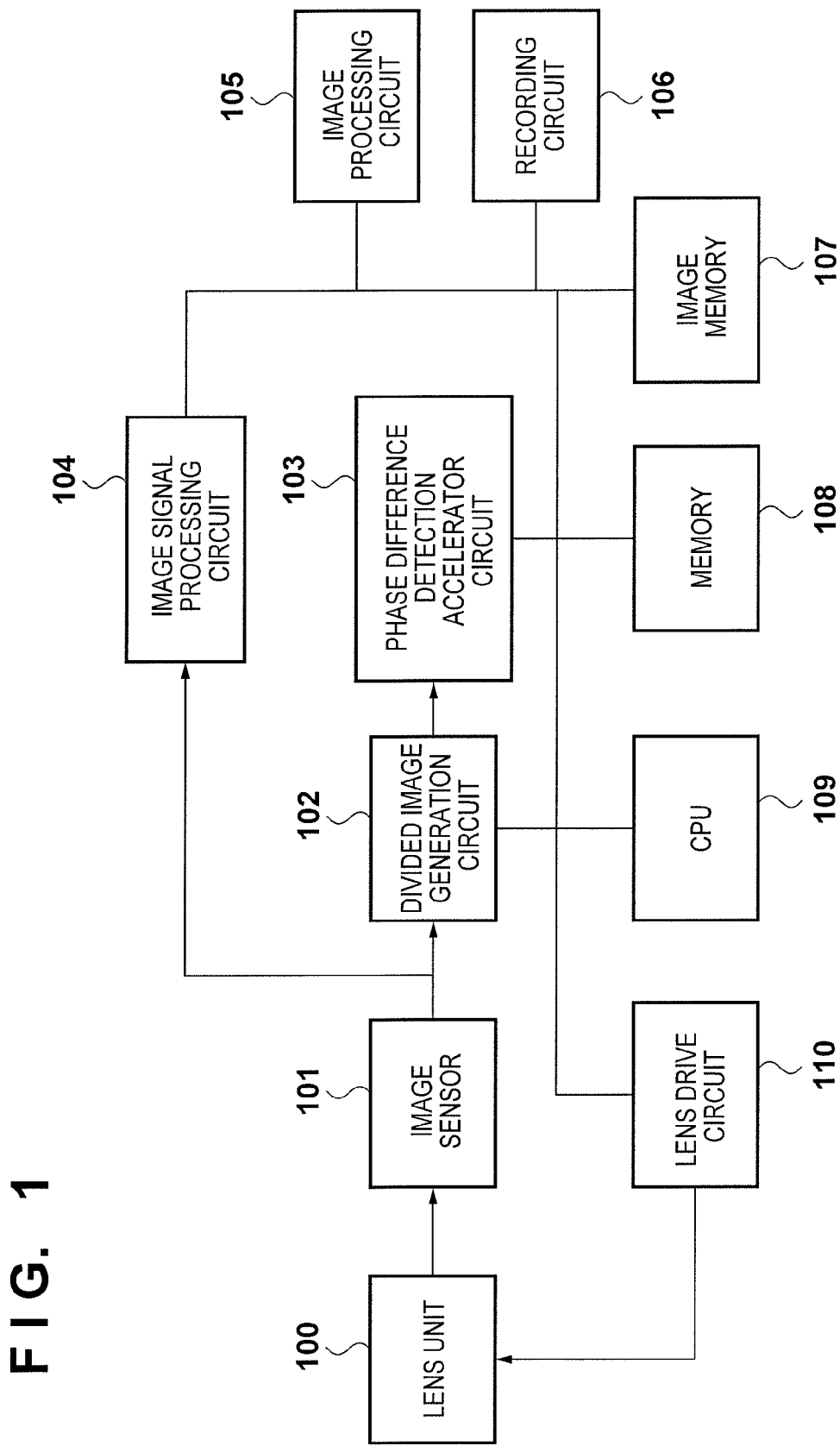

FIG. 2A
FIG. 2B
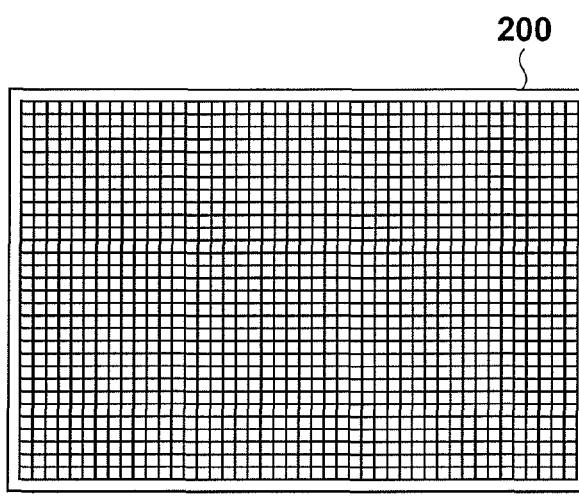
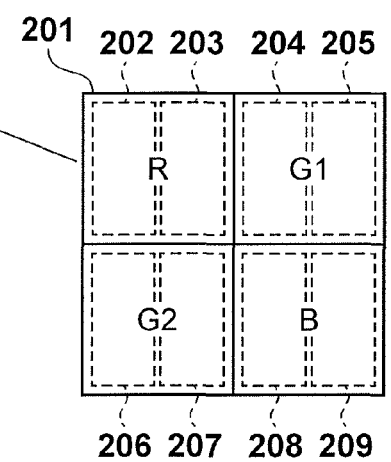

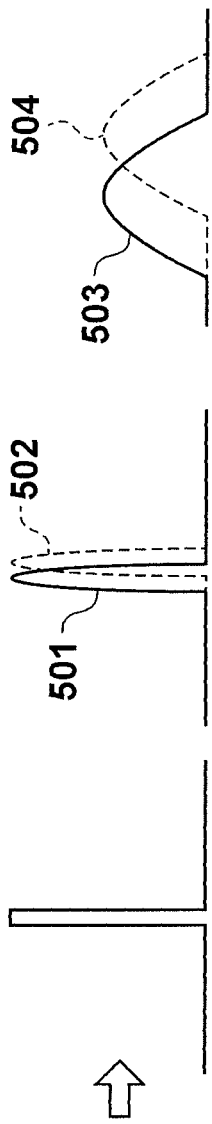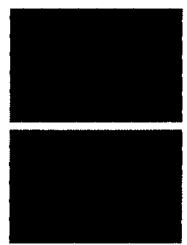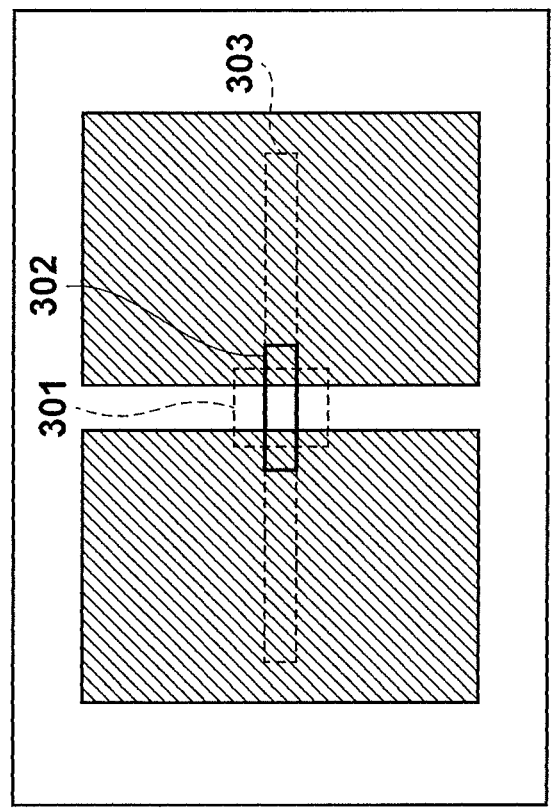

FOCUS DETECTION APPARATUS AND METHOD, METHOD OF CONTROLLING FOCUS DETECTION APPARATUS, AND IMAGE CAPTURING APPARATUS

BACKGROUND OF THE INVENTION

Field of the Invention

The present invention relates to a focus detection apparatus and method, method of controlling a focus detection apparatus and an image capturing apparatus and, more particularly, to focus detection processing in an image capturing apparatus such as a camera.

Description of the Related Art

Japanese Patent Laid-Open No. 58-24105 discloses, as a focus detection apparatus designed to detect the focus state of an imaging optical system, an apparatus designed to perform focus detection by a so-called pupil division method using a two-dimensional image sensor having a microlens formed on each pixel. In the focus detection apparatus disclosed in Japanese Patent Laid-Open No. 58-24105, the photoelectric conversion portion of each pixel constituting an image sensor is divided into a plurality of portions, and the divided photoelectric conversion portions receive light beams passing through different regions of the pupil of an imaging optical system through a microlens.

In addition, Japanese Patent Laid-Open No. 2005-106994 discloses an image capturing apparatus which performs focus detection by the pupil division method using a CMOS sensor as a type of image sensors. The image capturing apparatus disclosed in Japanese Patent Laid-Open No. 2005-106994 has a structure in which some pixels of many pixels constituting a CMOS sensor include photoelectric conversion portions each divided into two portions to detect the focus state of an imaging optical system. These two divided photoelectric conversion portions receive light beams passing through different regions of the pupil of the imaging lens through a microlens. It is possible to detect a focus state by detecting the phase difference between a pair of signals obtained from the divided photoelectric conversion portions. In addition, there is conventionally proposed a technique of adding a pair of signals obtained from a photoelectric conversion portion divided into two portions for each pixel and handling the resultant value as a pixel value from a general imaging pixel.

On the other hand, there is available a function of selecting an AF frame size and an AF frame position relative to a field angle in accordance with an imaging scene when setting an AF frame in a camera in accordance with user settings or, in some case, the result obtained by a main object detection system.

In the above technique of performing phase difference AF on an imaging plane, it has been considered how much pixel data for focus detection are to be read out and held. When, for example, holding signals from the entire sensor surface, the data amount from the sensor with each photoelectric conversion portion being divided into two portions is twice the data amount from the sensor whose photoelectric conversion portions are not divided. This will impose a heavy load on a processing system on the subsequent stage. With an increase in data amount, it is necessary to implement parallel processing or a high clock rate. In addition, a heat problem occurs, and it is necessary to take countermeasures against heat, resulting in difficulty in achieving low cost.

SUMMARY OF THE INVENTION

The present invention has been made in consideration of the above situation, and adjusts the data amount necessary for focus detection while keeping high focus detection accuracy in a focus detection apparatus which can perform phase difference focus detection on an imaging plane by using pixels including a plurality of photoelectric conversion portions.

According to the present invention, provided is a focus detection apparatus comprising: an image sensing unit including a plurality of photoelectric conversion elements for each microlens, with the microlenses being two-dimensionally arranged; a generation unit configured to generate a first signal pair having a first resolution by using signals output from the plurality of photoelectric conversion elements included in a first area of the image sensing unit which corresponds to a predetermined focus detection area and generate a second signal pair having a second resolution lower than the first resolution by using signals output from the plurality of photoelectric conversion elements included in a second area which corresponds to the predetermined focus detection area and is wider than the first area; a focus detection unit configured to perform phase difference focus detection processing based on at least one of the first signal pair and the second signal pair which are generated by the generation unit; and a recording image generation unit configured to generate a recording image by using a signal output from the image sensing unit.

Further, according to the present invention, provided is a method of controlling a focus detection apparatus including an image sensing unit including a plurality of photoelectric conversion elements for each microlens, with the microlenses being two-dimensionally arranged, the method comprising: a first generation step of generating a first signal pair having a first resolution by using signals output from the plurality of photoelectric conversion elements included in a first area of the image sensing unit which corresponds to a predetermined focus detection area; a second generation step of generating a second signal pair having a second resolution lower than the first resolution by using signals output from the plurality of photoelectric conversion elements included in a second area which corresponds to the predetermined focus detection area and is wider than the first area; a focus detection step of performing phase difference focus detection processing based on at least one of the first signal pair and the second signal pair; and a third generation step of generating a recording image by using a signal output from the image sensing unit.

Furthermore, according to the present invention, provided is a focus detection apparatus comprising: an image sensing unit including a pair of photoelectric conversion elements configured to receive a pair of pupil-divided light beams, respectively; a generation unit configured to generate a first signal pair having a first resolution by using signals output from the plurality of photoelectric conversion elements included in a first area of the image sensing unit which corresponds to a predetermined focus detection area and generate a second signal pair having a second resolution lower than the first resolution by using signals output from the plurality of photoelectric conversion elements included in a second area which corresponds to the predetermined focus detection area and is wider than the first area; a focus detection unit configured to perform phase difference focus detection processing based on at least one of the first signal pair and the second signal pair which are generated by the generation unit; and a recording image generation unit configured to generate a recording image by using a signal output from the image sensing unit.

Further, according to the present invention, provided is a method of controlling a focus detection apparatus including an image sensing unit including a pair of photoelectric conversion elements configured to receive a pair of pupil-divided light beams, the method comprising: a first generation step of generating a first signal pair having a first resolution by using signals output from the plurality of photoelectric conversion elements included in a first area of the image sensing unit which corresponds to a predetermined focus detection area; a second generation step of generating a second signal pair having a second resolution lower than the first resolution by using signals output from the plurality of photoelectric conversion elements included in a second area which corresponds to the predetermined focus detection area and is wider than the first area; a focus detection step of performing phase difference focus detection processing based on at least one of the first signal pair and the second signal pair; and a third generation step of generating a recording image by using a signal output from the image sensing unit.

Further, according to the present invention, provided is an image capturing apparatus comprising: an acquisition unit configured to acquire a pair of signals from an image sensing unit constituted by a plurality of pixels including a focus detection pixel configured to output the pair of signals by photoelectrically converting light beams passing through different pupil regions of an imaging optical system; a setting unit configured to select and set one of a plurality of predetermined combinations of a plurality of focus detection fields corresponding to a predetermined focus detection area and having different widths and a plurality of different resolutions for acquisition of the pair of signals; a generation unit configured to generate a focus detection luminance signal pair having the resolution of the combination from a pair of signals output from the focus detection pixel included in the focus detection field of the combination set by the setting unit; and a focus detection unit configured to perform phase difference focus detection processing by using the generated luminance signal pair, wherein the setting unit re-selects a combination having a resolution next higher than the resolution of the set combination if focus detection by the focus detection unit has succeeded as a result of focus detection processing, and re-selects a combination having a resolution next lower than the resolution of the set combination if focus detection has failed.

Further, according to the present invention, provided is a focus detection method comprising: an acquisition step of acquiring a pair of signals from an image sensing unit constituted by a plurality of pixels including a focus detection pixel configured to output the pair of signals by photoelectrically converting light beams passing through different pupil regions of an imaging optical system; a setting step of selecting and setting one of a plurality of predetermined combinations of a plurality of focus detection fields corresponding to a predetermined focus detection area and having different widths and a plurality of different resolutions for acquisition of the pair of signals; a generation step of generating a focus detection luminance signal pair having the resolution of the combination from a pair of signals output from the focus detection pixel included in the focus detection field of the combination set in the setting step; a focus detection step of performing phase difference focus detection processing by using the generated luminance signal pair; and a changing step of re-selecting a combination having a resolution next higher than the resolution of the set combination if focus detection has succeeded as a result of focus detection processing, and re-selecting a combination having a resolution next lower than the resolution of the set combination if focus detection has failed.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram showing an arrangement of a camera according to an embodiment of the present invention;

FIGS. 2A and 2B are views showing an example of an arrangement of an image sensor;

FIGS. 5A to 5E are views showing an example of an object and its image data;

DESCRIPTION OF THE EMBODIMENTS

Figure 3A:
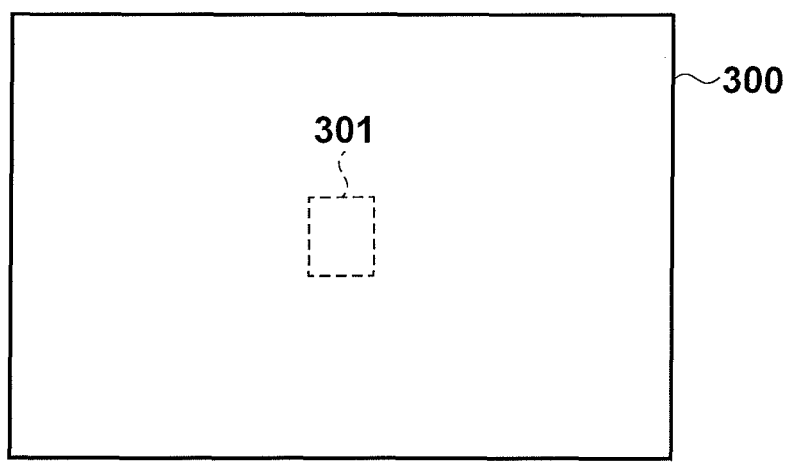
FIGS. 3A and 3B are views showing the relationship between an AF frame and a focus detection field.

Exemplary embodiments of the present invention will be described in detail in accordance with the accompanying drawings.

First Embodiment

FIG. 1 is a block diagram for explaining the system configuration of a camera including a focus detection apparatus according to the first embodiment of the present invention. In the camera according to this embodiment, a lens unit 100 includes a focus lens, a zoom lens, and a stop. An image sensor 101 photoelectrically converts a light beam from an object and outputs a signal. The detailed arrangement of the image sensor 101 according to this embodiment will be described below.

FIGS. 2A and 2B are views showing the details of the image sensor 101. FIG. 2A shows an imaging surface 200 of the image sensor 101. A block 201 shown in FIG. 2B is an enlarged view of a corner portion of the plurality of pixels included in the imaging surface 200. The imaging surface 200 is covered by a Bayer filter, and has an arrangement in which each of R, G, and B pixels has two photoelectric conversion elements sharing one microlens. For example, an R pixel is divided into two portions (two photoelectric conversion elements), namely an area A 202 and an area B 203. Likewise, G pixels and a B pixel each are divided into two portions to form areas A 204, 206, and 208 and areas B 205, 207, and 209. Each photoelectric conversion element can independently output a signal obtained by itself. This makes each pixel photoelectrically convert an object image formed by light beams passing through different pupil regions of the lens unit 100 and output two independent signals.

A divided image generation circuit 102 extracts a pair of signals output from areas A and B of each pixel from an area, of the image sensor 101 having the above arrangement, which is located at a predetermined position and has a predetermined width. The signals output from areas A of the respective readout pixels are collected to form image A, and the signals output from areas B are collected to form image B. It is possible to perform phase difference focus detection by extracting signals output from areas A and B and handling them as two different images. In this embodiment, one image A luminance data is generated by averaging the signals output from areas A 202, 204, 206, and 208 of R, G, and B pixels for each block 201. Likewise, one image B luminance data is generated by averaging the signals output from areas B 203, 205, 207, and 209 of the respective color pixels. In addition, let the converted (compressed) luminance data for each block 201 be the minimum unit, how much the data is to be compressed is designated, and data for focus detection for a predetermined range (to be described later) is formed.

A phase difference detection accelerator circuit 103 detects the contrast state of each focus detection data generated by the divided image generation circuit 102, and performs various types of correction processing such as optical distortion correction processing and electrical noise reduction processing for each focus detection data.

On the other hand, an image signal processing circuit 104 generates an image signal by combining, for each pixel, two signals from each pixel which are output from the image sensor 101 having the above arrangement. For example, adding the signals output from the area A 202 and the area B 203 of the R pixel will generate a normal R pixel image signal. The image signal processing circuit 104 then performs optical correction processing, electrical noise reduction processing, and the like for the generated image signal and temporarily holds the processed image signal in an image memory 107. An image processing circuit 105 converts the image signal held in the image memory 107 into a signal (an image for recording) in a predetermined video data format such as a moving image/still image format including MPEG2, MP4, and JPEG. A recording circuit 106 records the signal on a recording medium.

A CPU 109 performs various types of processes for controlling the operations of the above circuits, focus calculation, and lens drive control. A memory 108 holds programs and data handled by the CPU 109. In addition, a lens drive circuit 110 drives the focus, stop, and the like inside the lens unit 100.

Figure 3B:
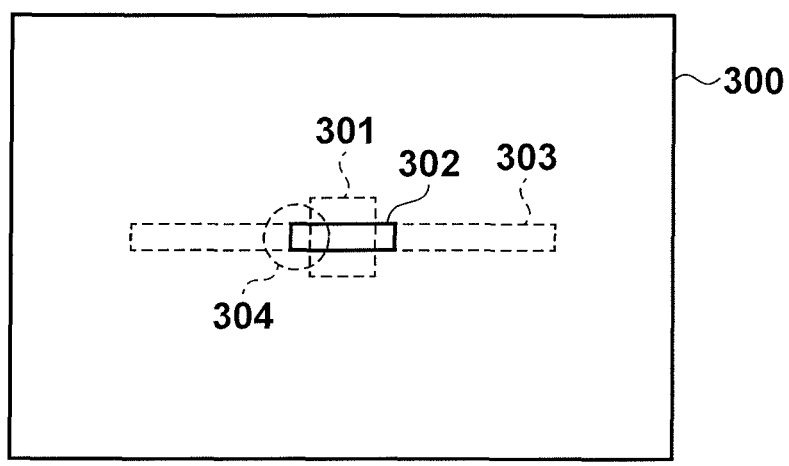

The generation of image data for focus detection in the first embodiment will be described in more detail below. Referring to FIG. 3A, a solid line 300 indicates an area corresponding to an angle of view on the imaging surface 200. In addition, a dotted line 301 indicates the focus detection area (AF frame) in the area 300. The size of the AF frame 301 is determined on the premise that the size allows the user to easily focus on an object. More specifically, when the horizontal and vertical lengths of the entire area 300 each are given as 100%, the horizontal and vertical lengths of the AF frame 301 are respectively given as 10% and 20%. When the AF frame 301 described above is set, the divided image generation circuit 102 generates two pairs of image data corresponding to two ranges with respect to the AF frame 301, as shown in FIG. 3B, having different resolutions. One of the two ranges corresponds to a small area 302 of a narrow range indicated by a solid line and the other corresponds to a large area 303 indicated by a broken line. The divided image generation circuit 102 obtains two pairs of image data such that the image data acquired for two ranges having different angles of view on almost the same line which is at the center of the AF frame 301 in the Y direction, have different resolutions. Note that the small area 302 is set to be wider than the AF frame 301 to extract data for assuring a search range for phase difference detection unique to phase difference focus detection.

Figures 4A, 4B, 4C:
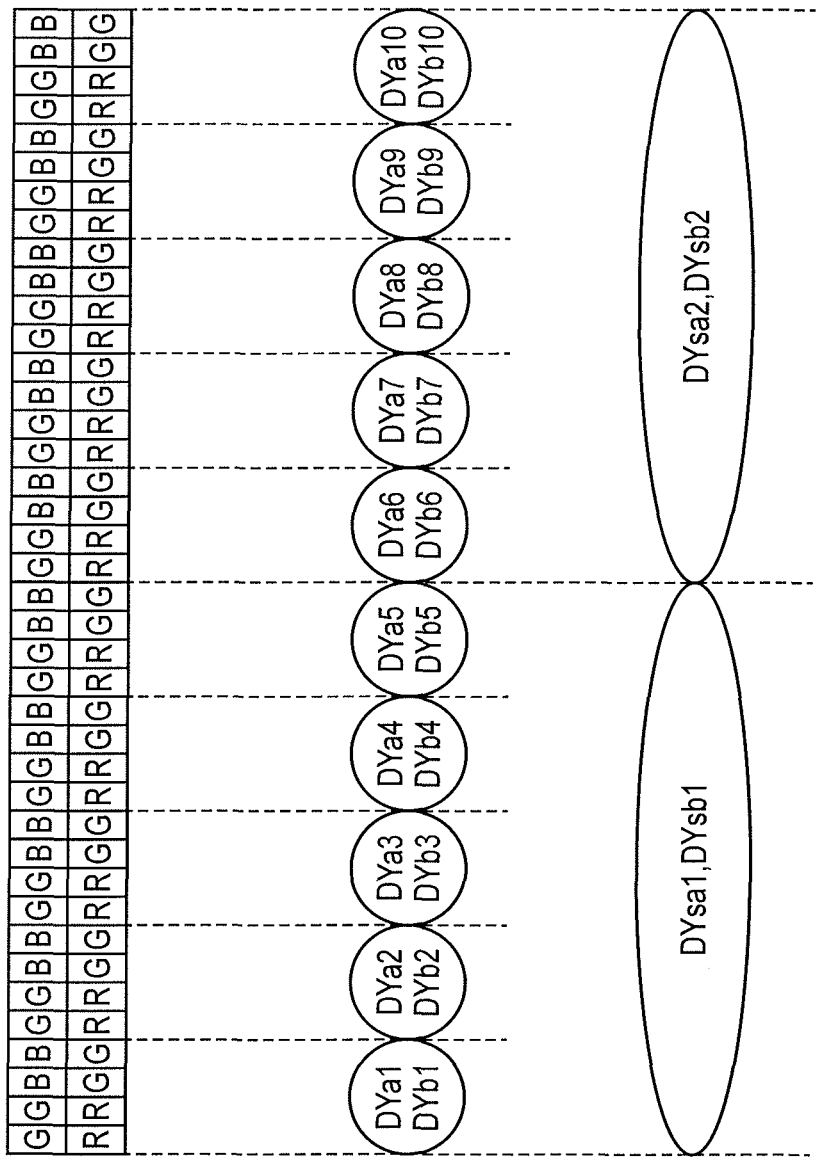
FIGS. 4A to 4C are schematic views showing resolutions in a small area and a large area.

Resolutions concerning the small area 302 and the large area 303 will be described next. FIG. 4A is an enlarged view of a partial region 304 of the small area 302 shown in FIG. 3B, which is enclosed with the dotted line circle. FIG. 4A shows the arrangement of the imaging surface 200 on a pixel basis. In contrast to this, FIG. 4B schematically shows the resolution of a signal when it is acquired from the small area 302, and FIG. 4C schematically shows the resolution of a signal when it is acquired from the large area 303.

The resolution of a signal obtained from the small area 302 in FIGS. 3A and 3B is preferably a sufficiently high resolution necessary for focus detection. For this reason, as shown in FIG. 4B, the apparatus converts signals from area A and area B into luminance signals by averaging them in the above manner for each Bayer unit (for each block 201) as the minimum unit constituted by G, B, G, and R pixels, thereby generating phase difference detection data DYai and DYbi. In addition, as shown in FIG. 4C, the apparatus converts signals from area A and area B in the large area 303 into luminance signals by separately averaging the respective signals for five Bayer units, thereby generating phase difference detection data DYsai and DYsbi each having a resolution suitable for the detection of a greatly defocused state. Note that one Bayer unit in the small area 302 and five Bayer units in the large area 303 are merely examples, and may be arbitrarily set as long as the resolution of the small area 302 is higher than that of the large area 303.

The reason why the apparatus acquires two sets of phase difference detection data having different resolutions in the above manner will be described below. FIG. 5A shows, as an example of an object, a single bar chart with one white vertical line drawn on a black background. FIG. 5B shows an image A signal and an image B signal obtained on an imaging plane when the object is focused. In an in-focus state, as shown in FIG. 5B, the apparatus obtains both images A and B on which a chart image is projected as it is. In contrast to this, in a slightly defocused state of the lens unit 100, the apparatus acquires an image, with an image shift occurring as indicated by an image A 501 and an image B 502 shown in FIG. 5C and edges being slightly blurred and widened. In addition, in a greatly defocused state with a larger blur, a large image shift occurs as indicated by an image A 503 and an image B 504 shown in FIG. 5D, and the signal levels decrease, resulting in considerably widened images.

The following will describe in detail image signals observed in the small area 302 and the large area 303 when the AF frame 301 is placed as shown in FIG. 5E with respect to the object shown in FIG. 5A in each state in which object images as described above are acquired.

Figure 6A:
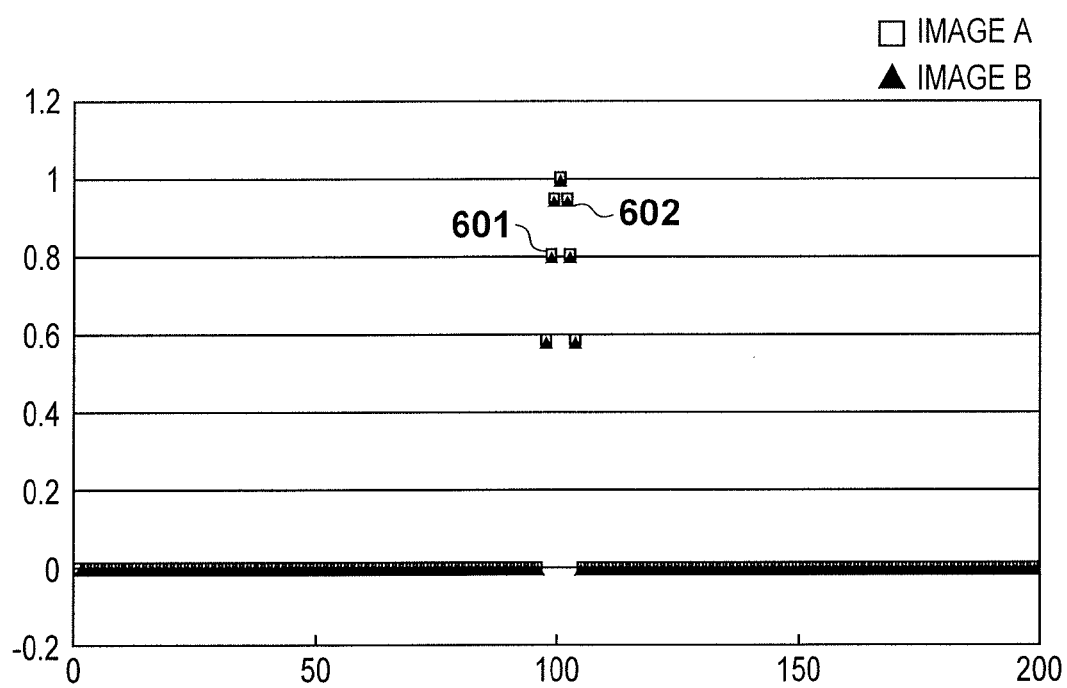
FIGS. 6A and 6B are graphs showing an example of data in a small area and a large area in a slightly defocused state.
Figure 6B:
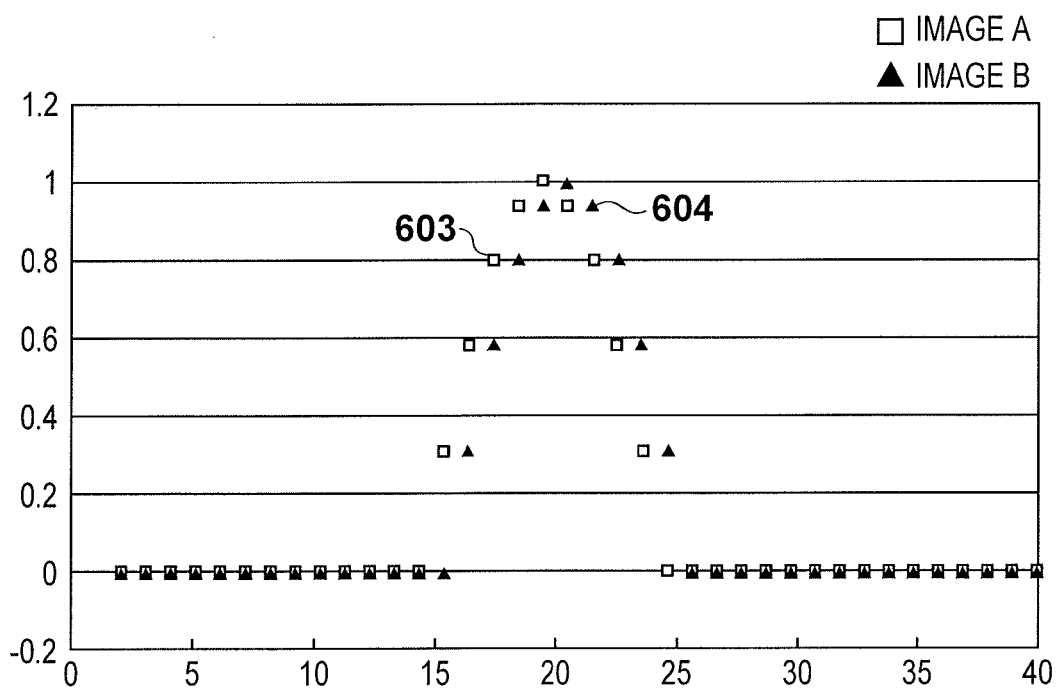

FIGS. 6A and 6B are graphs indicating a slightly defocused state. In each graph, the abscissa represents positions in the small area 302 and the large area 303, and the ordinate represents the normalized phase difference detection data DYai and DYbi (luminance values).

FIG. 6A shows phase difference detection data strings when, for example, phase difference detection data DYai 601 and DYbi 602 are acquired with a high resolution (for example, a resolution similar to that of the small area 302) from the large area 303. In this case, black-level data is widened, and the number of data to be handled increases. However, the ratio of data effective for phase difference detection (the data of a portion where a luminance phase shift has occurred) is low. In contrast, FIG. 6B shows phase difference detection data DYai 603 and DYbi 604 from the small area 302. In this case, the ratio of data effective for phase difference detection is sufficiently high, and sufficient detection accuracy is obtained. As described above, in a slightly defocused state, it is obvious that phase difference detection with higher accuracy can be performed by using the phase difference detection data DYai 603 and DYbi 604 with a higher resolution from the small area 302.

Figure 7A:
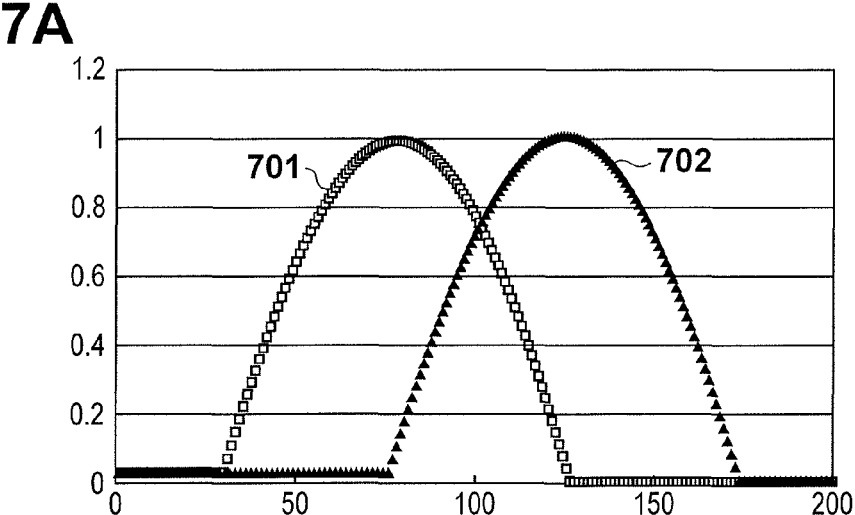
FIGS. 7A to 7C are graphs showing an example of data in a small area and a large area in a greatly defocused state.
Figure 7B:
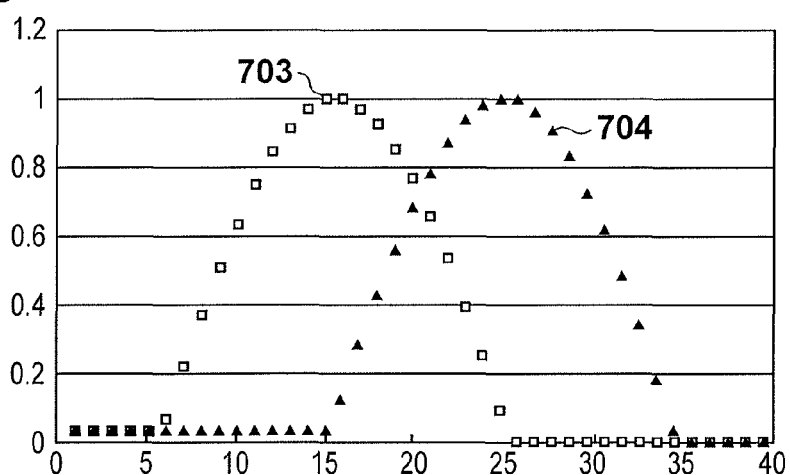
Figure 7C:
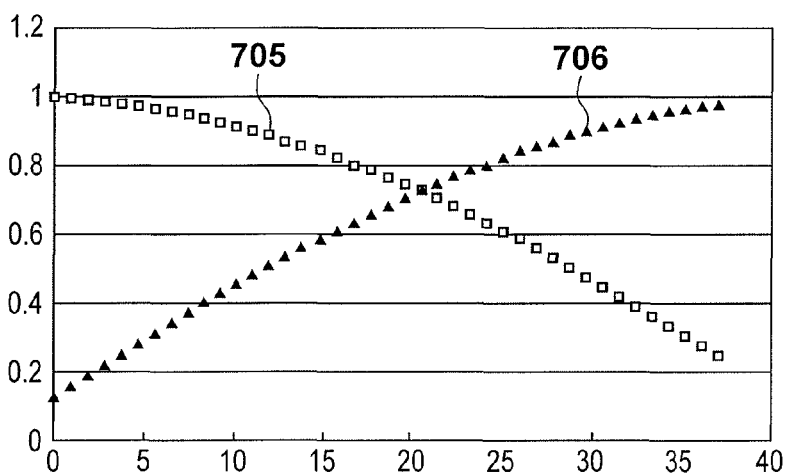

FIGS. 7A to 7C are graphs showing a greatly defocused state. FIG. 7A shows phase difference detection data strings when, for example, phase difference detection data DYai 701 and DYbi 702 are acquired with a high resolution (for example, a resolution similar to that of the small area 302) in the large area 303. In this case, it is obvious that the apparatus captures the entire image wider than the black-level data. Although the number of data to be handled increases, since the ratio of data effective for phase difference detection is high, the detection accuracy is sufficiently high.

In addition, FIG. 7B shows a case in which the apparatus acquires phase difference detection data DYsai 703 and DYsbi 704, in the large area 303, whose data amount is reduced to ⅕ by compression according to the present invention. As in the case of FIG. 7A, the data covers the entire object image widened by blur, and the ratio of data effective for phase difference detection is high. The detection accuracy may slightly deteriorate as compared with the case of FIG. 7A. However, since there is a large amount of defocus, it takes much time for driving the lens to the in-focus position after detection. It is therefore often possible to perform distance measurement again while driving the lens based on this result. For this reason, the detection accuracy required for such level of a greatly defocused state need not be very high, and hence it is possible to satisfy requirements concerning the focus detection accuracy in this greatly defocused state. In addition, when a large blur occurs, the obtained signal is distorted by the vignetting or the like of the optical system. In such cases, the focus detection accuracy was originally not often high. In any case, it is possible to greatly reduce the system load by calculating phase difference detection data with a low resolution like that in FIG. 7B and performing detection with necessary accuracy compared to a case of acquiring data with a high resolution like that in FIG. 7A, which causes to increase a data transfer load and processing load with a large amount of data to be handled.

On the other hand, FIG. 7C shows a case in which the apparatus acquires phase difference detection data with a higher resolution in the small area 302. Phase difference detection data DYai 705 and DYbi 706 cover only part of the chart. It is therefore not possible to perform accurate detection in computing an image shift amount by correlation computation or the like using the phase difference detection data DYai 705 and DYbi 706. For this reason, this embodiment uses phase difference detection data in a wide range and with a low resolution when performing detection in a greatly defocused state, and uses phase difference detection data in a narrow range and with a high resolution to perform accurate detection in a nearly in-focus state or slightly defocused state.

As described above, the phase difference detection accelerator circuit 103 in FIG. 1 receives two pairs of phase difference detection data in different ranges and with different resolutions, which are obtained with respect to one set AF frame. The phase difference detection accelerator circuit 103 detects a contrast state from the respective phase difference detection data, and digitally corrects optical components. The phase difference detection accelerator circuit 103 also performs various types of correction processing for reducing electrical noise components. The memory 108 stores the corrected phase difference detection data obtained as a result of these processes and a contrast evaluation value. A focus control system is configured such that the CPU 109 then performs correlation computation processing for the two images based on the phase difference detection data to detect a defocused state and drives the focus lens of the lens unit 100 via the lens drive circuit 110.

Figure 8:
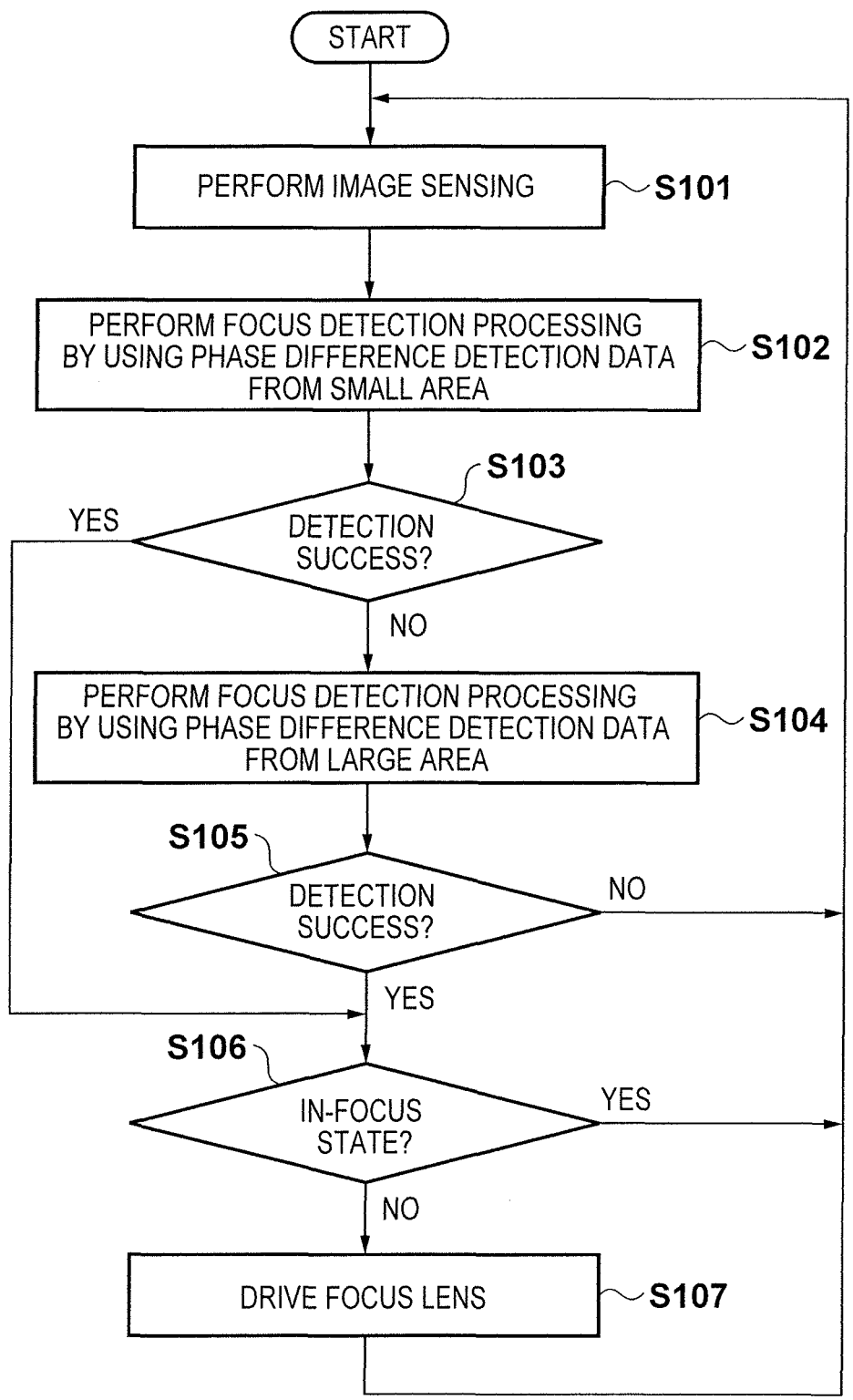
FIG. 8 is a flowchart for focus detection processing according to a first embodiment.

Focus detection processing using two pairs of phase difference detection data obtained in the above manner in this focus control system will be described next with reference to the flowchart of FIG. 8. By performing image sensing in step S101, the system obtains the two pairs of phase difference detection data DYai and DYbi, and DYsai and DYsbi from the small area 302 and the large area 303. In step S102, the system performs defocus computation (focus detection processing) by using the phase difference detection data DYai and DYbi from the small area 302. In step S103, the system performs error determination in defocus computation. Error determination in defocus computation in step S103 includes, for example, a case in which it is difficult to detect a defocus amount (in-focus state) in a greatly defocused state as has been described with reference to FIG. 7C. In addition, this includes errors originating from the characteristics of an object, for example, the object being a repetitive pattern difficult to perform correlation computation or having low contrast. If the system determines in step S103 that it has detected a defocus amount without any problem, the process advances to step S106. In contrast to this, if the system determines that it has failed to detect a defocus amount, the process shifts to step S104.

In step S104, the system performs defocus computation (focus detection processing) using the phase difference detection data DYsai and DYsbi in the large area 303. Performing defocus computation in a wide range by using data in a wide angle of view may make it possible to detect a defocus amount even if the object has low contrast or is a repetitive pattern. In addition, as described above, in a greatly defocused state, it is possible to obtain a detection result on a defocus amount which is very effective in a greatly defocused state.

If the system determines in step S105 that it could not detect a defocus amount because of a contrast or another factor as a result of defocus amount detection in S104, the system determines that the current focus detection processing using the current phase difference detection data has failed. The process then returns to step S101 to obtain other phase difference detection data. In this case, the system may sense the object again or set an AF frame at a different position in the same image or perform both operations.

If the system determines in step S106, from the detection result on the small area 302 in step S103 or the detection result on the large area 303 in step S105, that the object is almost in focus, the process returns to step S101 without driving the focus lens. If the system determines that the object is not in focus, the focus lens is driven based on the defocus amount obtained in step S107, then the process returns to step S101 to perform computation based on the signals obtained in the next image sensing again.

As described above, the first embodiment can reduce the data amount necessary for focus detection while keeping high focus detection accuracy by adjusting a pixel region used for focus detection and the resolution of signals obtained from the pixel region.

Second Embodiment

Figure 9:
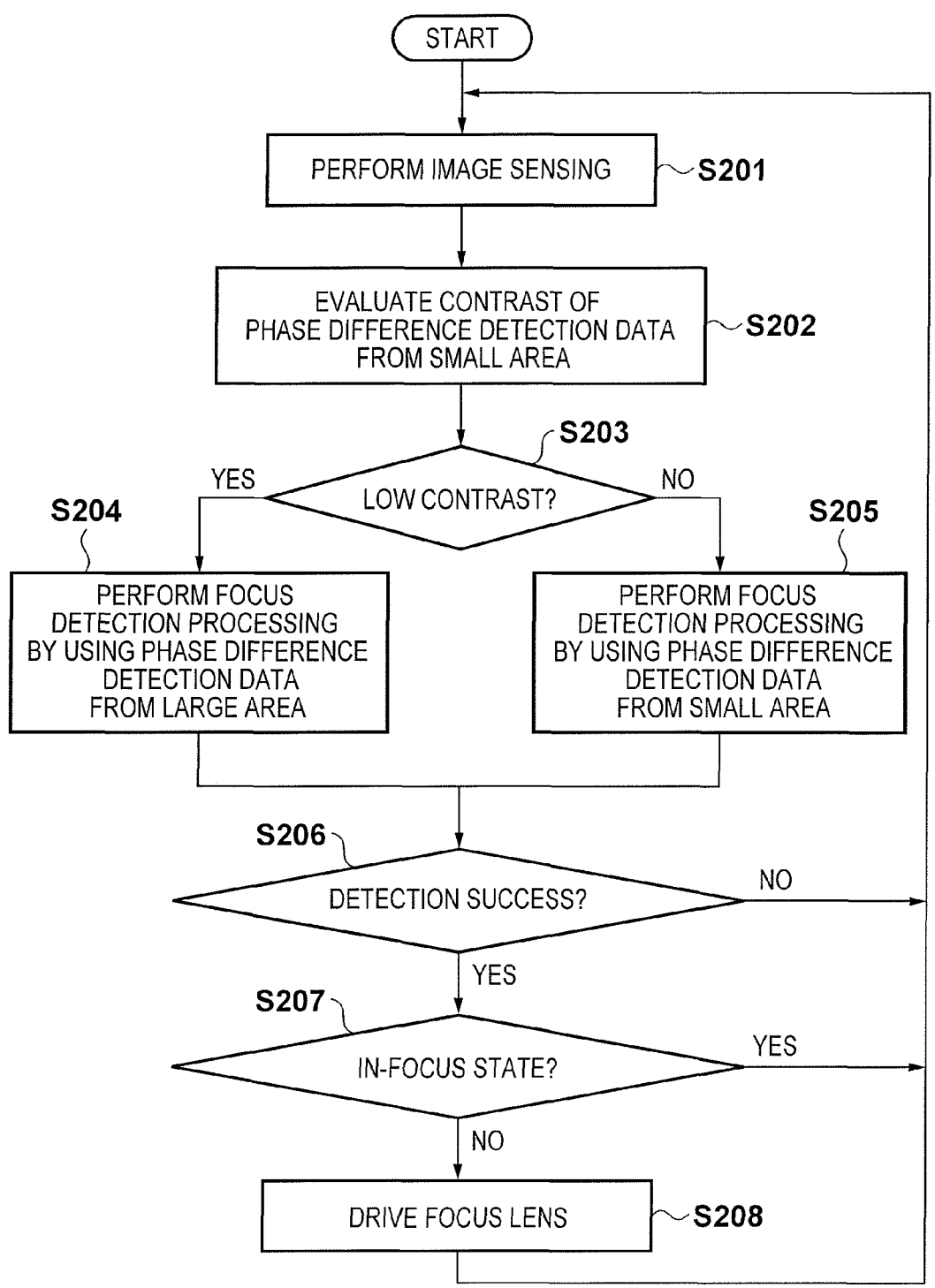
FIG. 9 is a flowchart for focus detection processing according to a second embodiment.

Another type of focus detection processing using two pairs of phase difference detection data in the second embodiment of the present invention will be described next with reference to FIG. 9. Note that since the arrangement of the camera is the same as that in the first embodiment described with reference to FIGS. 1, 2A, and 2B, a description of the arrangement will be omitted.

By performing images sensing in step S201, the apparatus obtains two pairs of phase difference detection data DYai and DYbi, and DYsai and DYsbi from a small area 302 and a large area 303. In step S202, the apparatus detects the contrast state of the phase difference detection data DYai and DYbi from the small area 302. If a low contrast, that is, the contrast is lower than a predetermined threshold, is determined in step S203, the apparatus performs defocus computation (focus detection processing) using the phase difference detection data DYsai and DYsbi from the large area 303 in step S204. On the other hand, if the apparatus determines that the contrast is equal to or higher than the threshold, the process shifts to step S205 to perform defocus computation using the phase difference detection data DYai and DYbi from the small area 302.

In step S206, if the defocus computation result obtained in step S204 or S205 indicates an error because of the contrast or another factor, the apparatus determines that the focus detection processing based on the current phase difference detection data has failed. The process then returns to step S201 to obtain other phase difference detection data. In this case, the apparatus may sense the object again, set an AF frame at a different position in the same image, or perform both operations.

On the other hand, if the apparatus has detected a defocus amount without any problem, the process shifts to step S207. If the apparatus determines, from the detection result on the small area 302 in step S204 or the detection result on the large area 303 in step S205, in step S207 that the camera is almost in focus, the process returns to step S201 without driving the focus lens. In contrast, if the apparatus determines that the camera is not in focus, the process returns to step S201, upon driving the focus lens is driven based on the defocus amount obtained in step S208, then the process returns to step S201 to perform computation based on the signals obtained in the next image sensing again.

As described above, according to the second embodiment, it is possible to reduce the data amount necessary for focus detection while keeping high focus detection accuracy by adjusting a pixel region used for focus detection and the resolution of signals obtained from the pixel region even when the contrast of an object is low.

Note that according to the above description, the apparatus performs focus detection processing in the second embodiment by using phase difference detection data from one of the small area 302 and the large area 303 in accordance with a contrast. However, if the contrast is not low, the apparatus may perform the processing in steps S102 to S104 in FIG. 8 described in the first embodiment instead of performing step S204.

Figure 10:
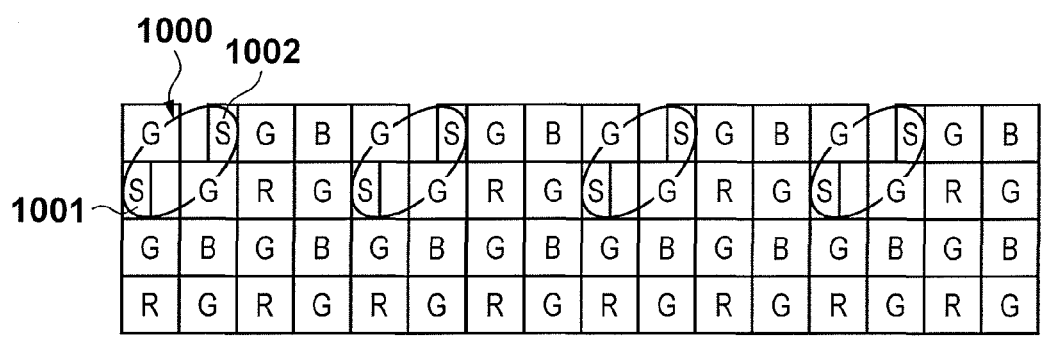
FIG. 10 is a view showing an example of the arrangement of another sensor.
Figure 11:
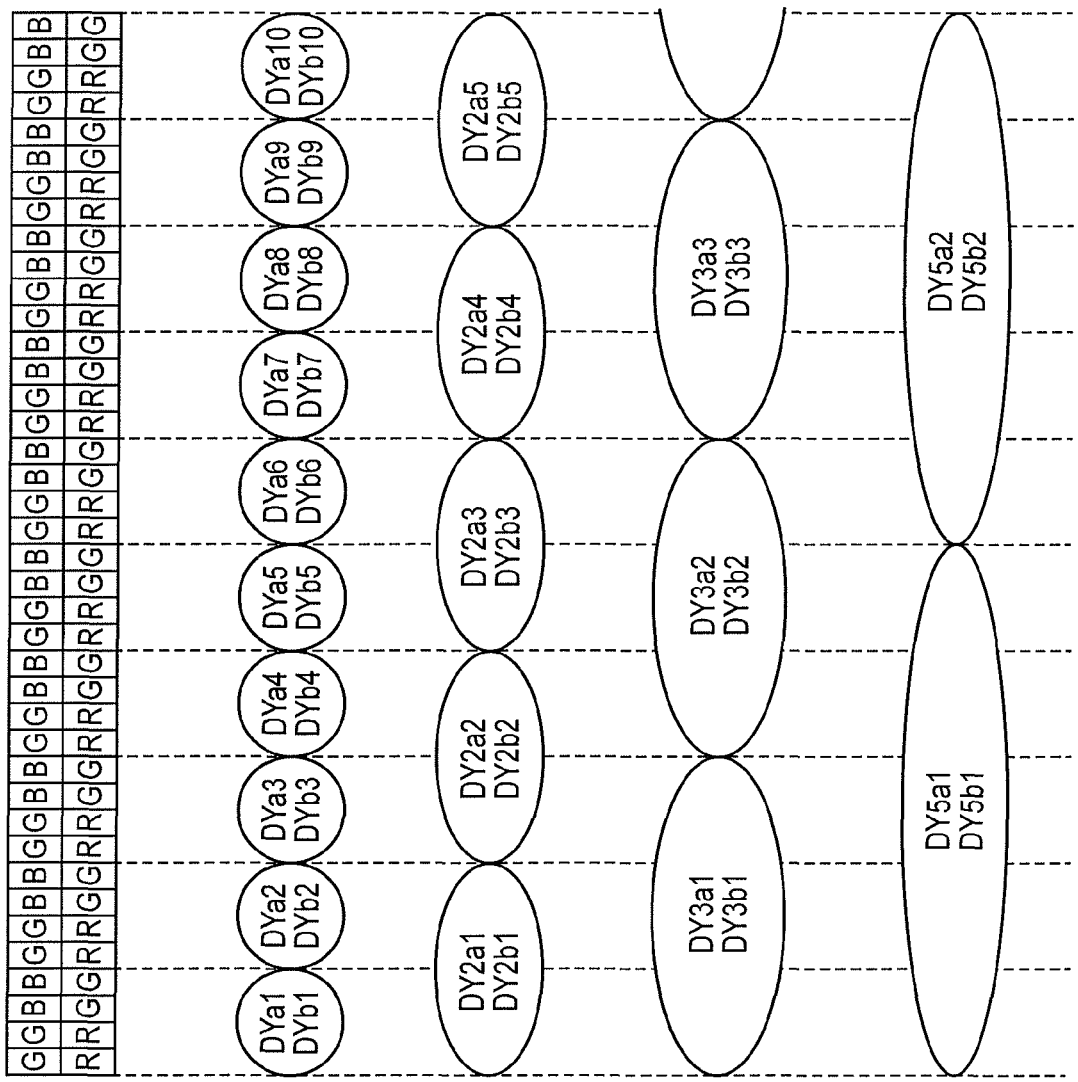
FIGS. 11A to 11E are schematic views showing resolutions according to a third embodiment.

In addition, according to the above description, two pairs of phase difference detection data described in the first and second embodiments are obtained from signals acquired from the same line. However, no problem occurs if readout lines differ slightly enough to be regarded as almost the same. In addition, the above embodiments have exemplified the case of using pixels each having a photoelectric conversion portion divided into two portions. However, even an image sensor having pairs of focus detection pixels having an arrangement like that shown in FIG. 10 can perform similar processing concerning the generation of two pairs of phase difference detection data in the present invention. FIG. 10 is a schematic view showing some pixels of an image sensor. In one Bayer unit, a pair of diagonally located pixels surrounded by a solid line 1000 respectively form an area A 1001 and an area B 1002. Such pairs of pixels may be arranged in the horizontal direction.

In addition, although the above embodiments have exemplified the case in which pixels each having a photoelectric conversion portion divided into two portions are arranged on the entire surface of the image sensor. However, focus detection pixels may be arranged discretely.

Third Embodiment

Another type of focus detection processing using two pairs of phase difference detection data in the third embodiment of the present invention will be described next with reference to FIGS. 11A to 14. Note that since the arrangement of the camera is the same as that in the first embodiment described with reference to FIGS. 1, 2A, and 2B, a description of the arrangement will be omitted.

In the first embodiment described above, when the apparatus acquires phase difference detection data, the divided image generation circuit 102 switches between acquiring high-resolution data from the small area 302 and acquiring low-resolution data from the large area 303. In contrast to this, the third embodiment will exemplify an arrangement which can switch between a plurality of resolutions when acquiring data from a large area 303. Note that in the first to third embodiments, resolution is not changed when a signal is output from the image sensor 101, but the divided image generation circuit 102 generates data having different resolutions. With this operation, it is possible to obtain an image signal whose resolution is maintained by inputting a signal having a constant resolution, which is output from the image sensor 101, to the image signal processing circuit 104. In addition, when performing focus detection, the divided image generation circuit 102 can optimize a data amount. This can reduce the processing load in focus detection and avoid a heat problem.

FIGS. 11A to 11E are views showing resolutions in the third embodiment. Like FIGS. 4A to 4C, FIGS. 11A to 11E are enlarged views of a partial region 304 of a small area 302 shown in FIG. 3B which is enclosed with the dotted line circle. FIG. 11A shows the arrangement of an imaging surface 200 on a pixel basis. FIGS. 11B to 11E schematically show four different resolutions.

The resolution of a signal obtained from the small area 302 is preferably a sufficiently high resolution necessary for focus detection. For this reason, as shown in FIG. 11B, the apparatus converts signals from area A and area B into luminance signals by averaging them in the above manner for each Bayer unit (for each block 201) as the minimum unit constituted by G, B, G, and R pixels, thereby generating phase difference detection data DYai and DYbi. In addition, as shown in FIGS. 11C to 11E, the apparatus converts signals from area A and area B in the large area 303 into luminance signals by separately averaging the respective signals for a plurality of Bayer units, thereby generating phase difference detection data DYnai and DYnbi each having a resolution suitable for the detection of a greatly defocused state. In the third embodiment, when a signal is read out from the large area 303, the apparatus selects one of resolutions including two Bayer units (FIG. 11C), three Bayer units (FIG. 11D), and five Bayer units (FIG. 11E).

Focus detection processing in the third embodiment will be described next with reference to the flowchart of FIG. 12.

When starting processing, in step S301 the apparatus sets, as an initial state, a combination of the small area 302 as a focus detection field and the resolution shown in FIG. 11B as a resolution. In step S302, the apparatus obtains phase difference detection data (the phase difference detection data DYai and DYbi in the initial state) with the set focus detection field and resolution, and performs defocus computation (focus detection processing). In step S303, the apparatus determines the reliability of the defocus amount obtained by defocus computation. In this reliability determination, the apparatus determines the reliability from the degree of coincidence or contrast state of phase difference detection data, and determines whether the reliability is higher than a predetermined reference to an extent that the detected defocus amount can be used without causing any problem, or lower than the predetermined reference.

If the apparatus determines that the reliability is lower than the predetermined reference, the process shifts to step S304 to increment a failure counter for counting the number of times of consecutive failures by one and clears a success counter for counting the number of times of consecutive successes to 0. Note that in the above operation, if the apparatus determines that the reliability is lower than the predetermined reference, the apparatus determines that focus detection has failed (detection failure). If the apparatus determines that the reliability is higher than the predetermined reference, the apparatus determines that focus detection has succeeded (detection success). In step S305, the apparatus compares the value of the failure counter with a threshold th2. If the number of times of consecutive failures is less than th2, the process returns to step S302 without changing any setting.

If the number of times of consecutive failures is equal to or larger than the threshold th2, the process shifts to step S306 to change the combination of the focus detection field and the resolution to a wider range and/or a lower resolution than the current settings. The process then returns to step S302. If, for example, the small area 302 and a resolution of one Bayer unit are currently set, the apparatus changes them to the large area 303 and a resolution of two Bayer units. In addition, if the large area 303 and a resolution of two Bayer units are currently set, since it is not possible to widen the focus detection field, the apparatus changes the resolution to a resolution of three Bayer units. Note, however, that if the currently set focus detection field and resolution are the maximum range and the lowest resolution, since it is not possible to change them anymore, the apparatus holds the current settings. Note that an integer equal to or more than 1 may be arbitrarily selected as the threshold th2 in consideration of operability, efficiency, and the like. In this case, if 1 is selected, the apparatus always performs the processing in step S306. If 2 or more is selected, the apparatus performs the processing in step S306 when it is consecutively determined a plurality of times that the reliability is not sufficient.

If the apparatus determines in step S303 that the reliability is equal to or more than the predetermined reference and sufficiently high (detection success), the process shifts to step S307 to increment the success counter by one and clear the failure counter to 0. In step S308, the apparatus compares the success counter with a threshold th1. If the number of times of consecutive successes is equal to or more than the threshold th1, the process advances to step S309 to change the combination of the focus detection field and the resolution to a narrower range and/or a higher resolution than the current settings. The process then advances to step S310. If, for example, the large area 303 and a resolution of three Bayer units are currently set, the apparatus changes them to the large area 303 and a resolution of two Bayer units. In addition, if the large area 303 and a resolution of two Bayer units are currently set, the apparatus changes them to the small area 302 and a resolution of one Bayer unit. Note, however, that if the currently set focus detection field and resolution are the minimum range and the highest resolution, since it is not possible to change them anymore, the apparatus holds the current settings. Note that, as will be described later, if the lower width limit of the focus detection field and an upper resolution limit are determined, the apparatus performs control so as not to exceed the determined limits. If the apparatus determines in step S308 that the number of times of consecutive successes is less than the threshold th1, the process shifts to step S310 without changing any setting. In step S310, the apparatus drives the focus lens in accordance with the detected defocus amount. Note that an integer equal to or more than 1 may be arbitrarily selected as the threshold th1 in consideration of operability, efficiency, and the like. In this case, if 1 is selected, the apparatus always performs the processing in step S309. If 2 or more is selected, the apparatus performs the processing in step S309 when it is consecutively determined a plurality of times that the reliability is sufficient.

With the above processing, if the reliability of the defocus amount obtained by defocus computation is high, the focus lens moves in the in-focus direction, and it is possible to acquire focus detection data from a narrower range and with a high resolution. If the reliability of the defocus amount is low, it is possible to acquire focus detection data from a wider range and with a lower resolution. This makes it possible to cope with the respective states shown in FIGS. 5A to 7C.

Note that in the above case, there are two focus detection fields, namely the small area 302 and the large area 303, and four types of resolutions shown in FIGS. 11A to 11E. However, the present invention is not limited to them. For example, it is possible to provide an intermediate area having an intermediate width between the small area 302 and the large area 303 and/or increase/decrease the number of types of resolutions.

Figure 12:
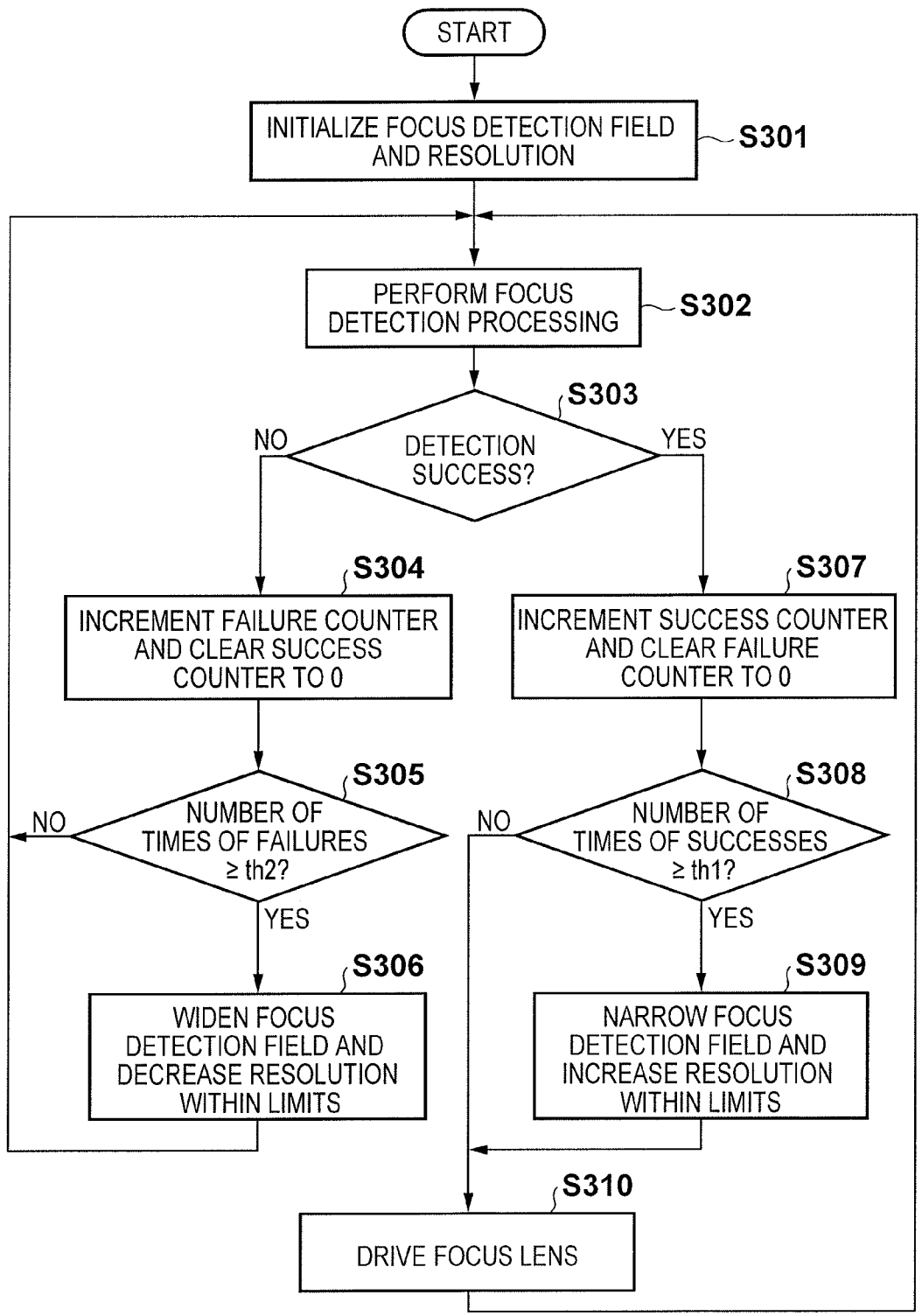
FIG. 12 is a flowchart for focus detection processing in the third embodiment.

In addition, referring to FIG. 12, the initial state set in step S301 is that data is read out from the small area 302 with a resolution of one Bayer unit. However, the present invention is not limited to this, and any initial state may be determined as needed.

Figure 13:
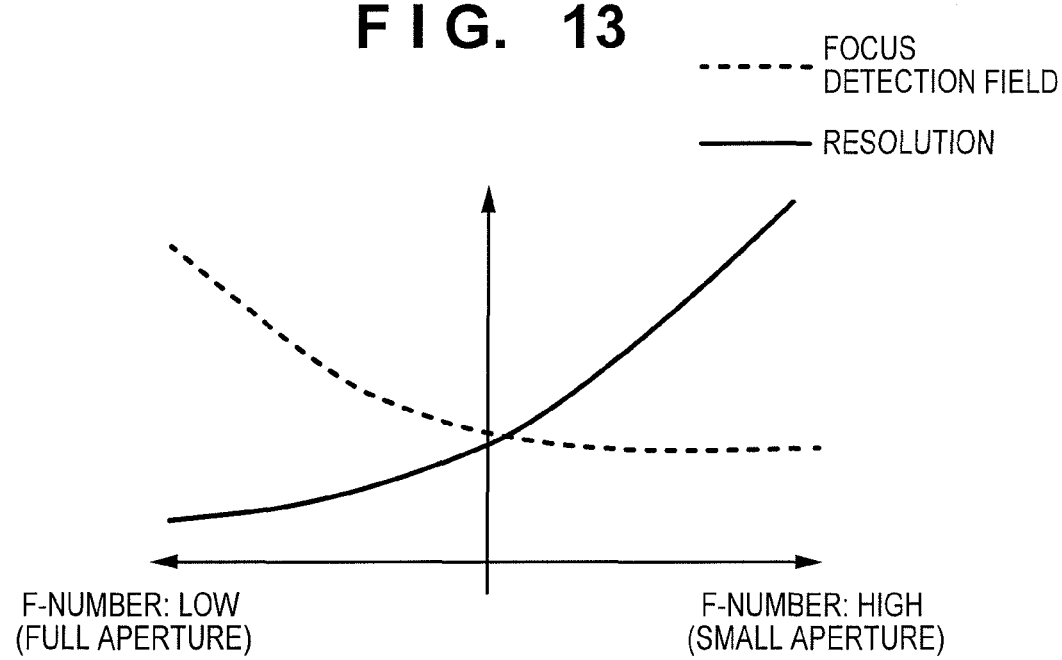
FIG. 13 is a graph showing the relationship between lens apertures, resolutions, and focus detection fields.
Figure 14:
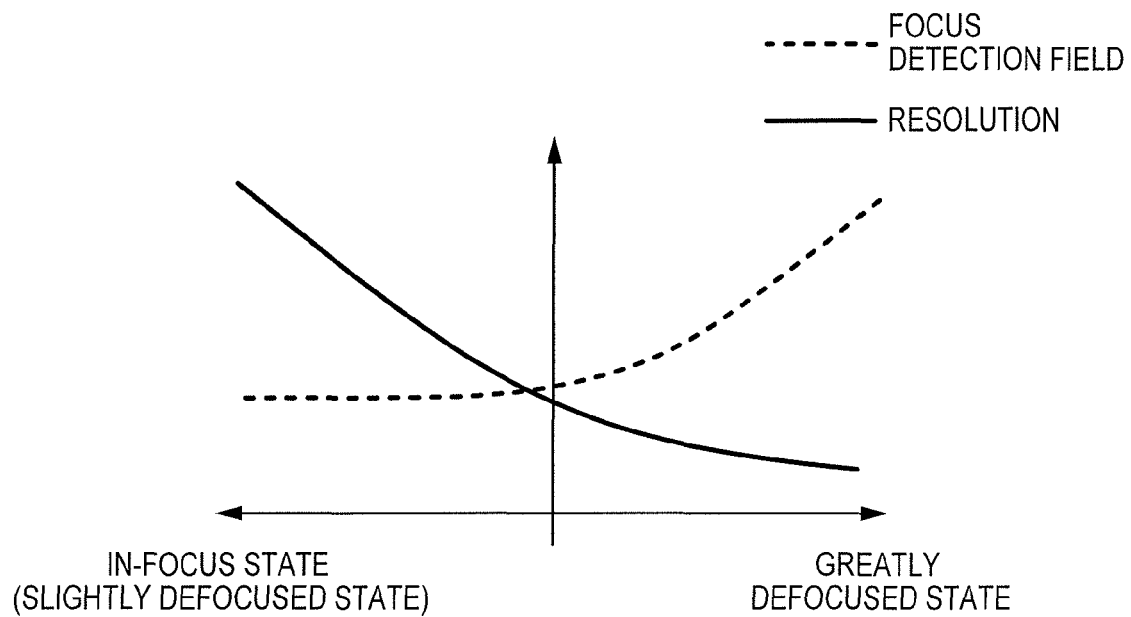
FIG. 14 is a graph showing the relationship between focus states, resolutions, and focus detection fields.

The lower width limit of the focus detection field and an upper resolution limit used in step S309 in FIG. 12 will be described next. FIG. 13 is a graph showing the relationship between f-numbers (aperture values) of a lens, focus detection fields, and resolutions. FIG. 14 is a graph showing the relationship between focus states, focus detection fields, and resolutions. The abscissa in FIG. 13 represents the f-numbers. The abscissa in FIG. 14 represents the focus states. Both the ordinates in FIGS. 13 and 14 represent the focus detection field values and resolution values. The focus detection field widens and the resolution increases upward along the ordinate. In addition, the focus detection field is indicated by the dotted line, and the resolution is indicated by the solid line.

As shown in FIG. 13, in the case of the full aperture, since the detection accuracy is high even if the resolution is somewhat low, it is possible to slightly decrease the resolution as compared with the case of a small aperture. That is, in the case of the full aperture, a resolution as high as one Bayer unit need not be set, and there are cases in which focus determination can be performed sufficiently with a resolution of two Bayer units. Therefore, the upper resolution limit and the lower width limit of the focus detection field described above are defined in advance based on such a relationship. In addition, as shown in FIG. 14, increasing the resolution and narrowing the focus detection field toward an in-focus state can assure the accuracy of focus detection processing and adjust the data amount of phase difference detection data necessary for focus detection processing.

If, for example, the aperture is f2.8 which is close to the full aperture, the lower width limit of the focus detection field is high, and the upper resolution limit is low, as shown in FIG. 13. Therefore, as the lower width limit of the focus detection field and the upper resolution limit used for focus detection processing, the large area 303 and the resolution shown in FIG. 11D are set. In this case, the apparatus sets the large area 303 and one of the resolutions shown in FIGS. 11D and 11E in accordance with the reliability of a defocus amount. Although not shown in FIGS. 11A to 11E, resolution or resolutions lower than five Bayer unit may be provided. In the case of a small aperture of f16, as shown in FIG. 13, the lower width limit of the focus detection field is low and the upper resolution limit is high. Therefore, as the lower width limit of the focus detection field and the upper resolution limit used for focus detection processing, the small area 302 and the resolution shown in FIG. 11B are set. In this case, the apparatus sets the small area 302 or the large area 303 and a resolution in the range of the states shown in FIGS. 11B to 11E in accordance with the reliability of a defocus amount.

When changing the upper limit in accordance with a focus state, in the case of f2.8 close to the full aperture, the apparatus changes the resolution to the resolution in FIG. 11C which is higher by one stage even if the upper resolution limit is set to that in FIG. 11D as described above. That is, the apparatus sets the lower width limit of the focus detection field and an upper resolution limit in accordance with the value obtained by integrating the value shown in FIG. 13 and the value shown in FIG. 14.

Setting the lower width limit of the focus detection field and an upper resolution limit in advance in the above manner can further adjust the data amount of phase difference detection data necessary for focus detection processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-123176, filed on Jun. 11, 2013, No. 2013-228755, filed on Nov. 1, 2013, which are hereby incorporated by reference herein in their entirety.

What is claimed is:

1. A focus detection apparatus comprising:
an image sensor including a plurality of photoelectric conversion elements which form a pair of signals having parallax;
a CPU controlling a focus detection using the pair of signals; and
a memory holding a program which makes the CPU and a circuit function as:
a generation unit configured to generate a first signal pair of a first resolution by using signals formed by the plurality of photoelectric conversion elements included in a first area which corresponds to a predetermined focus detection area and generate a second signal pair of a second resolution lower than the first resolution by combining signals formed by the plurality of photoelectric conversion elements included in a second area which corresponds to the predetermined focus detection area and is wider than the first area;
a focus detection unit configured to perform focus detection processing based on at least one of the first signal pair and the second signal pair which are generated by the generation unit; and
a recording image generation unit configured to generate a recording image by using a signal output from the image sensor.

2. The apparatus according to claim 1, wherein a center of the first area corresponds to a center of the second area.

3. The apparatus according to claim 1, wherein the focus detection performs the focus detection processing by using the first signal pair or the second signal pair depending on a defocus condition.

4. The apparatus according to claim 1,
wherein the focus detection unit performs the focus detection processing by using the second signal pair if a contrast of the first signal pair is lower than a predetermined threshold, and performs the focus detection processing by using the first signal pair if the contrast is not less than the threshold.

5. The apparatus according to claim 1, further comprising an imaging optical system including a focus lens,
wherein the plurality of photoelectric conversion elements form signals by photoelectrically converting a light beam passing through the imaging optical system.

6. The apparatus according to claim 1, further comprising microlenses, which correspond to pairs of the plurality of photoelectric conversion elements, respectively.

7. The apparatus according to claim 1, wherein the plurality of photoelectric conversion elements form the pair of signals having parallax by photoelectrically converting a light beams passing through different pupil regions.

8. The apparatus according to claim 1, wherein the second resolution of the second signal pair is lower than the first resolution in the phase difference detection direction.

9. The apparatus according to claim 1, wherein if the focus detection unit consecutively fails the focus detection processing using the first signal pair a plurality of times, then the focus detection unit performs the focus detection processing using the second signal pair.

10. The apparatus according to claim 9, wherein if the focus detection unit consecutively fails the focus detection processing using the first signal pair equal to or more than a threshold times, then the focus detection unit performs the focus detection processing using the second signal pair.

11. The apparatus according to claim 1, wherein the focus detection unit configured to perform phase difference focus detection processing based on at least one of the first signal pair and the second signal pair.

12. A method of controlling a focus detection apparatus including an image sensor that includes a plurality of photoelectric conversion elements which form a pair of signals having parallax, the method comprising:
generating a first signal pair of a first resolution by using signals formed by the plurality of photoelectric conversion elements included in a first area which corresponds to a predetermined focus detection area;
generating a second signal pair of a second resolution lower than the first resolution by combining signals formed by the plurality of photoelectric conversion elements included in a second area which corresponds to the predetermined focus detection area and is wider than the first area;
performing focus detection processing based on at least one of the first signal pair and the second signal pair; and
generating a recording image by using a signal output from the image sensor.

13. An image capturing apparatus comprising:
an image sensor including a plurality of photoelectric conversion elements which form a pair of signals having parallax;
a CPU controlling a focus detection using the pair of signals; and
a memory holding a program which makes the CPU and a circuit function as:
a setting unit configured to select and set at least one of a plurality of focus detection fields each corresponding to a predetermined focus detection area and having different widths and a plurality of different resolutions; and
a generation unit configured to generate a focus detection signal pair of a lower resolution than the pair of signals formed by the plurality of photoelectric conversion elements included in the focus detection field set by the setting unit by combining the pair of signals; and
a focus detection unit configured to perform focus detection processing by using the generated signal pair.

14. The apparatus according to claim 13, wherein the setting unit determines the focus detection field depending on a result of focus detection processing by the focus detection unit.

15. The apparatus according to claim 14, wherein the CPU and the circuit further function as:
a second setting unit configured to set an upper resolution limit and a lower width limit of the focus detection field based on an aperture and a focus state.

16. The apparatus according to claim 13, wherein the setting unit re-selects at least one of the plurality of focus detection fields if focus detection has failed consecutively a plurality of times.

17. The apparatus according to claim 13, wherein the setting unit does not re-select the focus detection field or fields when the resolution of the signals is a lowest resolution among the plurality of resolutions.

18. The apparatus according to claim 13, wherein the setting unit selects and sets the plurality of focus detection fields having the plurality of different resolutions by selecting and setting one of a plurality of predetermined combinations of the plurality of focus detection fields, and the setting unit re-selects a combination having a resolution next higher than a resolution of the set combination if a defocus amount detection by the focus detection unit has succeeded as a result of focus detection processing, and re-selects a combination having a resolution next lower than the resolution of the set combination if a defocus amount detection has failed.

19. The apparatus according to claim 13, wherein the second resolution of the second signal pair is lower than the first resolution of the first signal pair in the phase difference detection direction.

20. A focus detection method comprising:
acquiring a pair of signals having parallax from an image sensor including a plurality of photoelectric conversion elements;
selecting and setting at least one of a plurality of focus detection fields each corresponding to a predetermined focus detection area and having different widths and a plurality of different resolutions;
generating a focus detection signal pair of a lower resolution than the pair of signals formed by the plurality of photoelectric conversion elements included in the set focus detection field by combining the pair of signals; and
performing focus detection processing by using the generated luminance signal pair.

21. The method according to claim 20, wherein the selecting and setting of the plurality of focus detection fields having the plurality of different resolutions is performed by selecting and setting one of a plurality of predetermined combinations of the plurality of focus detection fields, and the combination is re-selected if the focus detection processing has failed consecutively a plurality of times.

* * * * *